United States Patent [19]
Thompson

[11] Patent Number: 5,551,405
[45] Date of Patent: Sep. 3, 1996

[54] MOTOR VEHICLE FUEL SYSTEM WITH INTERNAL VAPOR RESERVOIR

[75] Inventor: Robert H. Thompson, Redford, Mich.

[73] Assignee: Ford Motor Company, Dearborn, Mich.

[21] Appl. No.: 556,478

[22] Filed: Nov. 13, 1995

[51] Int. Cl.[6] .................................................... F02M 33/02
[52] U.S. Cl. ............................ 123/516; 123/510; 137/38
[58] Field of Search ..................................... 123/516, 509, 123/514, 510; 137/576, 594, 38, 41, 571, 579; 220/20.5, 86.1, 86.2

[56] References Cited

U.S. PATENT DOCUMENTS

| | | | |
|---|---|---|---|
| 3,907,153 | 9/1975 | Mutty | 220/86 R |
| 3,917,109 | 11/1975 | MacDonald | 220/85 VS |
| 4,279,232 | 7/1981 | Schuster | 123/516 |
| 4,312,649 | 1/1982 | Fujii | 127/38 |
| 4,468,687 | 8/1984 | Kurahashi | 123/516 |
| 4,531,653 | 7/1985 | Sakata | 137/38 |
| 4,589,395 | 5/1986 | Timms | 123/516 |
| 4,869,283 | 9/1989 | Oeffling et al. | 137/43 |
| 4,922,959 | 5/1990 | Sasaki | 123/514 |
| 4,958,655 | 9/1990 | Danek | 123/516 |
| 4,974,645 | 12/1990 | Johnson | 141/59 |
| 5,056,494 | 10/1991 | Kayanuma | 123/519 |
| 5,282,497 | 2/1994 | Allison | 141/59 |
| 5,408,977 | 4/1995 | Cotton | 123/516 |

FOREIGN PATENT DOCUMENTS

| | | |
|---|---|---|
| 2419350 | 11/1974 | Germany. |
| 554777 | 7/1943 | United Kingdom. |

Primary Examiner—Carl S. Miller
Attorney, Agent, or Firm—Jerome R. Drouillard

[57] ABSTRACT

A motor vehicle fuel system is provided. The fuel system includes a fuel tank which has an upper wall portion and defines a first interior volume for storing fuel therein. The first interior volume includes a first ullage space adjacent the upper wall portion. The fuel system of the present invention also includes a generally cup-shaped vapor reservoir carried within the first interior volume. The reservoir has vertically extending sides, a horizontally extending top and an open bottom operative to define a second interior volume open to the bottom of the fuel tank. The second interior volume includes a second ullage space in fluid communication with the first ullage space. Fluid communication between the first and second ullage spaces is effected by providing a small bleed orifice and a large orifice arranged in parallel fluid relationship with the small bleed orifice in the top of the reservoir. A valve device which normally closes the large orifice during reflecting of the vehicle is movable between a closed position and an open position in response to acceleration of the vehicle.

14 Claims, 1 Drawing Sheet

MOTOR VEHICLE FUEL SYSTEM WITH INTERNAL VAPOR RESERVOIR

BACKGROUND OF THE INVENTION

1. Field of the Invention

The present invention relates to a motor vehicle fuel system, and more particularly, to an automotive fuel system having a fuel tank with a vapor reservoir positioned therein.

2. Description of Related Art

One of the many design requirements of an automotive fuel system is that the system include means for controlling the level of fuel within the fuel tank to prevent over-filling of the tank on refueling. A sufficient amount of headspace or ullage space must be maintained adjacent the upper wall portion of the tank so that vapor vents disposed in the upper wall portion of the tank function as intended. In addition, sufficient ullage space is required to ensure that the vapor pressure within the tank is maintained at acceptable levels.

It is known to preserve ullage space within a fuel tank by providing a vapor reservoir within the tank. The reservoir traps fuel vapor during refueling in substantially the same manner as an overturned cup in a sink traps air when the sink is filled With water. FIG. 1 illustrates a prior art fuel system 10 which incorporates a vapor reservoir 12 within a fuel tank 14. Fuel system 10 further includes a plurality of vapor vent valves 16, with one valve located at each corner of the upper wall portion of tank 14. Fuel from a fuel dispensing nozzle (not shown) is introduced into tank 14 through filler tube 18. Vent tube 20 is connected to filler tube 18 in conventional fashion (not shown) and operates to activate an automatic shut-off mechanism in the fuel dispensing nozzle when the level of fuel in tank 14 reaches a predetermined maximum level. A bleed hole 22 in the top of reservoir 12 permits the fuel vapor trapped within reservoir 12 to slowly escape into the ullage space adjacent the upper wall portion of tank 14 such that the size of that ullage space gradually increases over time following the refueling operation. In the illustrated prior art design, bleed hole 22 has a diameter of approximately 0.05 inch, vapor reservoir 12 has a volume of about four to five gallons, and fuel tank 14 has a volume of about twenty-five gallons.

One drawback associated with prior art fuel system 10 is that the time required for the trapped vapors to escape from reservoir 12 following the refueling operation is relatively long. As a result, it would be desirable to provide a fuel system having a vapor reservoir capable of trapping vapors during refueling and rapidly transferring these vapors to the ullage space adjacent the upper wall portion of the tank following refueling.

SUMMARY OF THE INVENTION

The present invention provides an improved motor vehicle fuel system with the above-described capabilities. The fuel system includes a fuel tank which has an upper wall portion and defines a first interior volume for storing fuel therein. The first interior volume includes a first ullage space adjacent the upper wall portion. A generally cup-shaped vapor reservoir is carried within the first interior volume. The reservoir has vertically extending sides, a horizontally extending top and an open bottom operative to define a second interior volume open to the bottom of the fuel tank. The second interior volume includes a second ullage spar, and the top of the reservoir includes means for effecting fluid communication between the first ullage space and the second ullage space. The means for effecting fluid communication between the first and second ullage spaces includes a small bleed orifice, a large orifice arranged in parallel fluid relationship with the small bleed orifice, and movable valve means. The movable valve means is movable between a closed position closing said large orifice and an open position in response to acceleration of the vehicle.

In one aspect of the present invention the movable valve means comprises a seat having sloped sides and a ball. The seat is provided in surrounding relationship with the large orifice. The ball is seatable in fluid tight relationship with the seat in a closed position and is displaceable from the fluid tight relationship in response to acceleration of the vehicle.

The present invention provides a new and improved fuel system for controlling the level of fuel within a fuel tank to prevent over-filling of the tank on refueling. The problems associated with prior art fuel systems are solved by providing a vapor reservoir within the fuel tank from which vapor rapidly escapes in response to acceleration of the vehicle.

Other features and advantages of the present invention will be apparent to those skilled in the art from a study of the following written description and drawings.

DETAILED DESCRIPTION OF THE PREFERRED EMBODIMENTS

Figure 2:
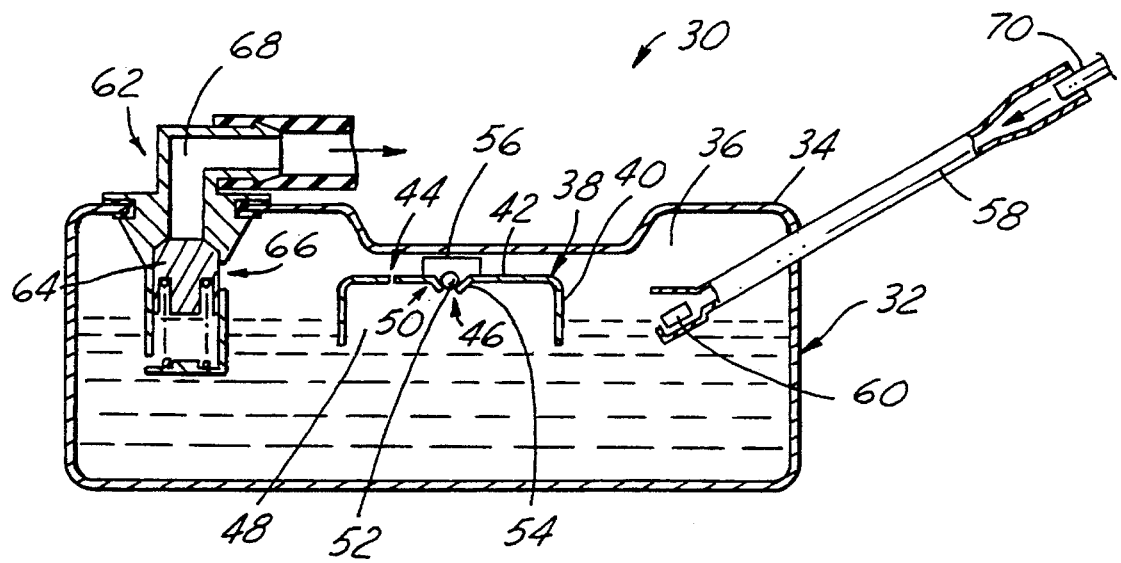
FIG. 2 is a sectional view of a motor vehicle fuel system according to the present invention.
Figure 1:
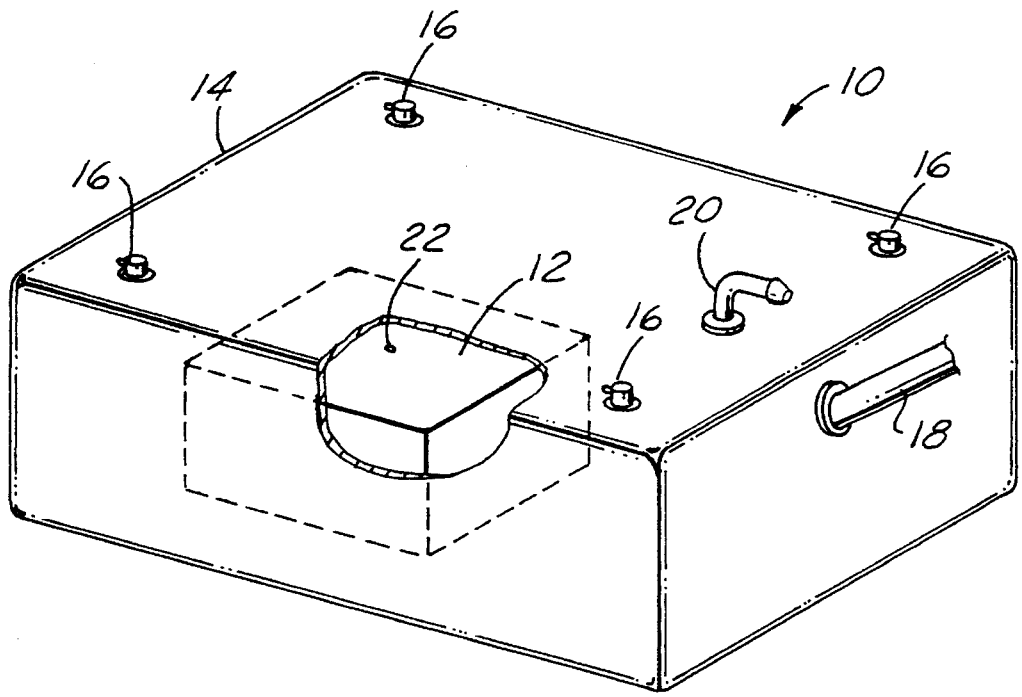
FIG. 1 is a partially cut-away, perspective view of a motor vehicle fuel system according to the prior art.

Referring now to FIG. 2, an onboard refueling vapor recovery fuel system 30 for an automotive vehicle is shown. Fuel system 30 includes a fuel tank 32 having an upper wall portion 34. Tank 32 defines an interior volume having a first ullage space 36 adjacent upper wall portion 34.

A generally cup-shaped vapor reservoir 38 is provided within tank 32 for trapping fuel vapors during refueling of the vehicle. Reservoir 38 has vertically extending sides 40 and a horizontally extending top 42 which define an interior volume open to the bottom of tank 32. Preferably, the volume ratio of tank 32 to reservoir 38 is about 10:1. Reservoir 38 may be secured within tank 32 in any suitable fashion, as for example by fastening reservoir 38 to upper wall portion 34 with spot-welded brackets (not shown).

Top 42 of reservoir 38 contains a pair of orifices, referenced herein as small bleed orifice 44 and large orifice 46. Small bleed orifice 44 preferably has a diameter of about 0.012 to 0.017 inch. Large orifice 46 is larger than bleed orifice 44, preferably having a diameter of about 0.20 to 0.45 inch. Large orifice 46 is normally sealed during refueling such that vapors are trapped within reservoir 38, forming a second ullage space 48 therein. After refueling and upon sufficient acceleration of the vehicle, orifice 46 is opened to effect fluid communication between ullage spaces 36 and 48 therethrough. Vapors trapped within reservoir 38 thereby pass rapidly out of reservoir 38 and into ullage space 36.

Any suitable valve means may be used to open and close orifice 46. Particularly preferred valve means are depicted in FIG. 2 as seat 50 and ball 52. As illustrated, seat 50 surrounds orifice 46 and is provided with sloped sides 54. Ball 52 is sized to seal orifice 46 when seated in the closed position shown in FIG. 2. Preferably, ball 52 has a diameter of about 0.25 to 0.50 inch, is made of stainless steel, and is provided with a polished outer surface to ensure a fluid tight fit with seat 50 adjacent orifice 46. Seat 50 and ball 52 are configured such that ball 52 is displaceable from this closed or sealed position in response to acceleration of the vehicle. That is, ball 52 is able to roll upwardly along sides 54 once a threshold acceleration is achieved. Preferably, the weight of ball 52 and the angle of inclination of sides 54 are selected such that the threshold acceleration required to displace ball 50 is about 0.25 g (m/s$^2$). A suitable retaining means, such as fluid permeable cage 56, is disposed around seat 50 for retaining ball 52 therein.

As illustrated in FIG. 2, fuel system 30 further includes a fuel filler pipe 58, which is equipped with an anti-expulsion valve 60, and a level responsive vapor vent valve 62 having a float member 64. Valve 62 operates to vent vapors from tank 32 by providing a fluid communication path from ullage space 36 through valve orifice 66 to an external vapor recovery device (not shown) when the level of liquid fuel underneath float member 64 is below a predetermined maximum level. The operation of valve 62 on refueling the vehicle is described below.

During refueling, filler pipe 58 receives a supply of fuel from a dispensing nozzle 70 and delivers the fuel to tank 32 in conventional fashion through an end of the pipe positioned within the tank. As tank 32 fills with liquid fuel, vapor within tank 32 becomes trapped within reservoir 38, forming ullage space 48 as previously described. Concurrently, the rising level of liquid fuel within tank 32 displaces float member 64 upwardly towards the closed position illustrated in FIG. 2. On reaching the closed position, float member 64 closes valve orifice 66, preventing vapors within tank 32 from being vented through vapor passage 68 to the external vapor recovery device. The resulting rise in pressure within tank 32 actuates an automatic shut-off device in nozzle 70 in conventional fashion, and the flow of fuel to tank 32 is halted.

Vehicle acceleration after refueling displaces ball 52 from orifice 46, permitting vapor stored within ullage space 48 to pass rapidly into ullage space 36. This transfer of vapor from ullage space 48 to ullage space 36 causes the level of fuel below vapor reservoir 38 to rise and the level of fuel within the remainder of tank 32 to fall. As a result, float member 64 drops from its closed position, rapidly reestablishing the fluid communication path between ullage space 36 and the vapor recovery device.

In the event that the vehicle remains parked after the refueling operation, small bleed orifice 44 permits vapor transfer from ullage space 48 to ullage space 36 that is effective over time to reestablish the above-described fluid communication path.

From the foregoing description, one of ordinary skill in the art can easily ascertain the essential characteristics of this invention and, without departing from the spirit and scope of the claims, make various changes and modifications to the invention to adapt it to various uses and conditions.

What is claimed is:

1. A motor vehicle fuel system, comprising:
 a fuel tank having an upper wall portion and defining a first interior volume for storing fuel therein, said first interior volume including a first ullage space adjacent said upper wall portion; and
 a generally cup-shaped vapor reservoir carried within said first interior volume and having vertically extending sides, a horizontally extending top and an open bottom operative to define a second interior volume open to the bottom of said fuel tank, said second interior volume including a second ullage space, said top including means for effecting fluid communication between said first ullage space and said second ullage space, said means for effecting fluid communication including:
 a small bleed orifice;
 a large orifice arranged in parallel fluid relationship with said small bleed orifice;
 and valve means movable between a closed position closing said large orifice and an open position in response to acceleration of said vehicle.

2. The fuel system of claim 1, wherein said valve means includes:
 a seat having sloped sides in surrounding relationship with said large orifice; and
 a ball seatable in fluid tight relationship in said seat in said closed position and displaceable from said fluid tight relationship to said open position in response to acceleration of said vehicle.

3. The fuel system of claim 2, wherein said ball has a polished outer surface.

4. The fuel system of claim 2, further comprising retaining means disposed around said seat for retaining said ball within said seat.

5. The fuel system of claim 4, wherein said retaining means comprises a fluid permeable cage.

6. The fuel system of claim 1, further comprising a level responsive vapor vent valve operative to provide a fluid communication path from said first ullage space to a location external to said fuel tank.

7. The fuel system of claim 6, wherein said level responsive vapor vent valve includes a float member.

8. The fuel system of claim 1, further comprising a filler pipe having an end positioned within said fuel tank and operable to provide fuel to said fuel tank.

9. A motor vehicle fuel system, comprising:
 a fuel tank having an upper wall portion and defining a first interior volume for storing fuel therein, said first interior volume including a first ullage space adjacent said upper wall portion;
 a level responsive vapor vent valve operative to provide a fluid communication path from said first ullage space to a location external to said fuel tank; and
 a generally cup-shaped vapor reservoir carried within said first interior volume and having vertically extending sides, a horizontally extending top and an open bottom operative to define a second interior volume open to the bottom of said fuel tank, said second interior volume including a second ullage space, said top including means for effecting fluid communication between said first full age space and said second ullage space, said means for effecting fluid communication including:
 a small bleed orifice;
 a large orifice arranged in parallel fluid relationship with said small bleed orifice;
 a seat having sloped sides in surrounding relationship with said large orifice; and a ball seatable in fluid tight relationship in said seat and displaceable from said fluid tight relationship in response to acceleration of said vehicle.

10. The fuel system of claim 9, wherein said ball has a polished outer surface.

11. The fuel system of claim 9, further comprising retaining means disposed around said seat for retaining said ball within said seat.

12. The fuel system of claim 11, wherein said retaining means comprises a fluid permeable cage.

13. The fuel system of claim 9, wherein said level responsive vapor vent valve includes a float member.

14. The fuel system of claim 9, further comprising a filler pipe having an end positioned within said fuel tank and operable to provide fuel to said fuel tank.

* * * * *